United States Patent
Dungan et al.

(10) Patent No.: US 6,306,282 B1
(45) Date of Patent: Oct. 23, 2001

(54) SLUDGE-FREE TREATMENT OF COPPER CMP WASTES

(75) Inventors: Lawrence James Dungan, Santa Clara; Leon Han, San Jose, both of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/225,210

(22) Filed: Jan. 4, 1999

(51) Int. Cl.[7] ................................. C02F 1/46; C02F 1/62
(52) U.S. Cl. .................. 205/574; 205/580; 205/557; 205/742
(58) Field of Search ...................... 205/580, 574, 205/557, 742

(56) References Cited

U.S. PATENT DOCUMENTS

| | | | |
|---|---|---|---|
| 4,066,520 | * 1/1978 | Emmett, Jr. et al. | 205/584 |
| 5,340,370 | 8/1994 | Cadien et al. | |
| 5,573,676 | 11/1996 | Massholder et al. | |

FOREIGN PATENT DOCUMENTS

| | | |
|---|---|---|
| 2 146 316 | 4/1985 | (GB) . |
| 93/10050 | 5/1993 | (WO) . |
| 98/49102 | 11/1998 | (WO) . |

OTHER PUBLICATIONS

Publication by Sampson Engineering Inc., Technical Specification 15550, Copper–Bearing Wastewater Treatment System (CTS), Oct. 1997.

Brochure by Koch Membrane Systems Inc., "Koch Membrane Systems announces partnership with Amrutech", Northern California Plant Engineering and Maintenance Show, Sep. 30 and Oct. 1, 1998.

Photograph of "Hybrid System"(no date).

Publication by Tenchic, Inc. and Kinetico Engineering Systems, Inc., "Integrated Systems for Water Recycling, Metal Recovery & Zero Discharge for Semiconductor Lead Frame Plating & Wafer Sawing", Dec. 1994.

News release by U.S. Filter, "U.S. Filter Introduces Copper CMP Recovery System", Jul. 11, 1998.

Publication by U.S. Filter, Mar. 26, 1998.

Lyle KIRMAN "Copper Removable From CMP Wastewater", Kinetico Incorporated prepared for SEMATECH meeting, Apr. 7, 1998.

* cited by examiner

*Primary Examiner*—Arun S. Phasge

(57) ABSTRACT

Waste slurry containing dissolved metal from e.g., CMP is subjected to sludge-free processing. Embodiments include separating the waste slurry with a solids filter into a solids-free dissolved metal-containing liquid filtrate portion and a concentrated solids-containing portion, removing the dissolved metal from the filtrate by means of an ion exchanger, back-washing the concentrated solids-containing portion with metal-free effluent from the ion exchanger to further reduce its dissolved metal content, discharging the washed concentrated solids-containing portion to a waste drain, removing the metal from the ion exchanger in solution form, and optionally extracting solid metal from the solution by electrowinning.

20 Claims, 2 Drawing Sheets

SLUDGE-FREE TREATMENT OF COPPER CMP WASTES

FIELD OF THE INVENTION

The present invention relates to a method and system for sludge-free treatment of waste liquid slurries containing at least one dissolved metal. More particularly, the invention relates to a method and system for the sludge-free treatment of dissolved metal-containing slurries employed in chemical-mechanical polishing (CMP) such as performed during "back-end" metallization processing of semiconductor integrated circuit devices.

BACKGROUND OF THE INVENTION

This invention relates to treatment and disposal of waste liquid slurries containing a dissolved metal and is of particular utility in "back-end" metallization processing of integrated circuit semiconductor devices having copper-based contacts, vias, interlevel metallization, and device interconnection routing.

Metal films are utilized in semiconductor manufacturing technology to form electrically conductive contacts to active as well as passive device regions or components formed in or on a semiconductor substrate, as well as for filling via holes, interlevel metallization, and interconnection routing patterns for wiring together the components and/or regions. Metals employed for such purposes include titanium, tantalum, aluminum, nickel, cobalt, silver, gold, copper, and their alloys. Of these, copper and copper-based alloys are particularly attractive for use in VLSI and ULSI multilevel metallization systems employed for. "back-end" processing of semiconductor wafers. Copper has a very low resistivity, i.e., even lower than that of aluminum, and a significantly higher electromigration resistance. Moreover, copper and its alloys enjoy a considerable cost advantage over silver and gold and their alloys.

With reference to FIG. 1, schematically shown therein in cross-sectional view is a process of particular utility in the "back-end" metallization of integrated circuit devices, and useful in the manufacture of various electrical components, circuit boards, etc., which process employs "damascene" (or in-laid) technology to form recessed metallization patterns and/or contacts. Illustratively, substrate 1 comprises a semiconductor wafer, typically of monocrystalline silicon, comprising at least one active device region formed therein or thereon. In an initial step, the desired conductor pattern is defined as a plurality of recesses 2 such as grooves, trenches, holes, etc. in a dielectric layer 3 formed over the semiconductor substrate. A subsequent step comprises deposition of a suitably conductive metal layer 5 (e.g., copper or a copper alloy) filling the recesses 2. Typically, in order to ensure complete filling of the recesses, the metal layer 5 is deposited as a blanket layer of excess thickness t so as to overfill the recesses and cover the upper surface 4 of the dielectric layer 3. Although the upper surface 6 is shown in the figure as planar for illustrative simplicity, in practice it is highly non-planar as a result of the uneven substrate topography and the characteristics of its method of deposition.

In the next step according to damascene technology, the entire thickness t of the metal layer 5 over the surface of the dielectric layer 3 is removed by a planarization process, typically chemical-mechanical polishing ("CMP"), leaving metal portions 5' in the recesses 2 with their exposed surfaces 7 substantially coplanar with the surface 4 of the dielectric layer 3. Such damascene process forms in-laid conductors in a dielectric layer while advantageously avoiding problems associated with other types of processes, e.g., metal etching and dielectric gap filling.

In a typical CMP method employing conventional apparatus, the semiconductor wafer 1 is rotated against a rotating polishing pad while an abrasive and chemically reactive solution/slurry is supplied to the rotating pad. Other CMP apparatus may utilize an oscillating or continuous belt pad.

Slurries used for CMP of silicon semiconductor wafers can be divided into three categories, depending upon their intended use: silicon polish slurries, oxide polish slurries, and metal polish slurries. The silicon polish slurries are formulated for polishing and planarizing bare silicon wafers, whereas the oxide polish slurries are designed for polishing and planarizing a dielectric layer on a wafer, typically a layer of a silicon oxide. The metal polish slurries, which are utilized in and form the subject of the process according to the present invention, are employed for polishing and planarizing a conductive metal-containing layer on a semiconductor wafer.

As described above, the conductive metal-containing layer is typically deposited on a dielectric layer and can comprise tungsten, titanium, aluminum, nickel, cobalt, copper, silver, gold, and alloys thereof. Commonly employed CMP metal polishes include very small particles of an abrasive, such as silica, alumina, or ceria, having a diameter of about 50–1,000 nm, suspended in a water-based liquid vehicle. The proportion of the particles in the slurry depends upon the particular slurry used and typically is in the range of about 1–5% by weight. The pH of a metals polish slurry may vary from slightly acidic (e.g., about 5.0) to approximately neutral (e.g., about 7.5), depending upon the particular formulation used. In the case of the slightly acidic formulations, the pH is optionally controlled by the addition of an organic acid such as acetic or citric acid. In addition, the slurry may contain one or more oxidizing agents for solubilizing the conductive metal-containing material and, thus, assist in its removal. Typical oxidizers include hydrogen peroxide, potassium ferricyanide, ferric nitrate, and/or mixtures thereof. Additional details concerning compositions of metals polishing slurries for CMP processing of semiconductor wafers, as well as process parameters, are described in U.S. Pat. No. 5,340,370, the entire disclosure of which is incorporated herein by reference.

During CMP, the abrasive action of the slurry particles on the metallization layer(s) and pattern(s) on the wafer surface results in the removal of very small particles of metal (i.e., on the order of about 0.2 um), which particles are rapidly solubilized (i.e., dissolved) by the oxidizing and other proprietary agents contained in the CMP slurry. As a result, used or spent CMP, even when diluted with rinse water, contains a significant concentration of dissolved metal.

In some CMP systems, spent slurry and rinse water are not segregated, with both being directed down a waste drain. The volume of rinse water used is typically more than thirty times and as much as one hundred times the volume of spent slurry. In a typical semiconductor manufacturing plant, from about 10 to about 100 gpm of fabrication polishing wastes (i.e., spent slurry+waste water) are discharged to a waste drain. The large amount of chemical consumption due to passage of such large waste volumes adds considerably to the adverse environmental impact of wafer manufacture. An important consideration also is the toxicity of several of the metals which may be dissolved in the spent slurry as a result of CMP of particular metallization systems, which toxicity may impose severe environmental constraints on discharge of CMP wastes. In addition to the above, a significant economic consideration of such CMP waste disposal is the loss of expensive metals, e.g., silver and gold, dissolved in the CMP waste stream.

Moreover, although CMP slurries are expensive, the risk of damaging a wafer whose value is in the tens of thousands of dollars militates against any possible use of recycled slurry as a means of cost savings. As a practical matter, the risk of wafer damage from use of recycled slurry cannot be greater than the risk of damage from the use of fresh slurry. Consequently, recycling of spent CMP slurry is not commonly practiced in the semiconductor manufacturing industry.

In another conventional approach to disposal of CMP wastes, spent CMP slurries are treated, as by filtering, to separate the solids (polishing aggregates) therefrom prior to discharge of the liquid filtrate into a drain. The separated solids are then supplied to a filter press for compressing the solids into a filter cake ("sludge") for off-site disposal. However, inasmuch as such sludge is, in many areas, considered a hazardous waste because of the process that generated it, handling of such off-site disposal is not desirable under many circumstances.

As an optional adjunct to the above process, in some instances the filtrate obtained from the solids separation is subjected to processing, typically ion exchange, for removal of the dissolved metal prior to discharge to the waste drain. As a further option, the dissolved metal may be recovered from the filtrate in a solid form for re-use.

Thus, there exists a need for a method and system for treating spent or waste CMP slurries containing at least one dissolved metal, which does not suffer from the problems and drawbacks of the prior art, i.e., discharge of large amounts of untreated process waste liquids into a waste drain, discharge of toxic or otherwise environmentally hazardous metals into the waste stream, generation and problems associated with disposal of hazardous solid waste sludge, and loss of expensive metals used in "back-end" metallization processing of semiconductor wafers.

Moreover, there exists a need for an improved method and system for treating CMP waste slurries which is compatible with existing CMP methodology and fully satisfies environmental requirements and standards for disposal of both the solid and liquid components of CMP processing wastes.

DISCLOSURE OF THE INVENTION

An advantage of the present invention is a sludge-free method of treating a waste liquid slurry containing dissolved metal(s), such as is produced by CMP of semiconductor wafers during "backend" metallization processing.

Another advantage of the present invention is a sludge-free method of treating a waste liquid slurry containing dissolved metal(s), wherein the slurry solids are separated from the liquid containing the dissolved metal(s), treated to further reduce the concentration of dissolved metal(s) therein to an environmentally acceptable low level, and then discharged in a sludge-free manner into a waste drain.

Still another advantage of the present invention is a sludge-free method of treating a waste liquid slurry containing dissolved metal(s), wherein the liquid containing the dissolved metal(s) is separated from the slurry solids, the dissolved metal(s) is (are) removed from the separated liquid, a portion of the metal(s)-free liquid is used to wash the separated slurry solids, and another portion of the metal(s)-free liquid is discharged to a waste drain in an environmentally acceptable state or recycled for use in CMP processing.

A further advantage of the present invention is a sludge-free method of treating a waste liquid slurry containing dissolved metal(s), wherein the liquid containing the dissolved metal(s) is separated from the slurry solids, the metal(s) is (are) removed from the liquid, the metal(s) is (are) recovered in solid form for re-use, and the slurry solids are directly discharged in an environmentally acceptable state.

Another aspect of the present invention is a system for performing sludge-free treatment of a waste liquid slurry containing dissolved metal(s).

A further aspect of the present invention is a system for performing sludge-free treatment of a waste liquid slurry containing dissolved metal(s) and recovering the metal(s) in solid form for re-use.

Additional advantages, aspects, and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to one aspect of the present invention, the foregoing and other advantages are achieved in part by a sludge-free method of treating a waste liquid slurry containing dissolved metal(s), which method comprises the steps of:

providing a waste treatment system including a solids filter and an ion exchanger;

supplying the waste liquid slurry containing dissolved metal(s) to the solids filter to separate the slurry into a first, solids-free liquid filtrate portion containing the dissolved metal(s) and a second, concentrated solids-containing waste portion having a substantially reduced dissolved metal(s) concentration;

passing the first, solid-free liquid filtrate portion through the ion exchanger to substantially remove the dissolved metal(s) and provide a substantially metal(s) free liquid effluent therefrom;

washing the second, concentrated solids-containing waste portion in the solids filter by passing therethrough a first portion of the substantially metal(s free liquid effluent from the ion exchanger, thereby further reducing the amount of dissolved metal(s) contained therein; and discharging the washed concentrated solids-containing waste portion into a waste drain, thereby providing a sludge-free treatment of the waste slurry.

In embodiments according to the invention, a second portion of the substantially metal(s)-free liquid effluent from the ion exchanger is discharged to a waste drain or re-cycled for use in CMP processing, the metal(s) removed from the filtrate by the ion exchanger are extracted therefrom as a liquid solution, and the extracted liquid solution is treated, as by electrowinning, to obtain solid-metal(s) therefrom for re-use.

According to another aspect of the present invention, a sludge-free method of treating a dissolved copper-containing waste liquid slurry from a chemical-mechanical polishing (CMP) process comprises the steps of:

providing a waste treatment system including a solids filter and an ion exchanger;

supplying the copper-containing waste liquid slurry to the solids filter to separate the slurry into a first, solid-free liquid filtrate portion containing dissolved copper and a second, concentrated solids-containing waste portion having a substantially reduced dissolved copper concentration;

passing the first, solids-free liquid filtrate portion through the ion exchanger to substantially remove the dissolved copper and provide a substantially copper-free effluent therefrom;

washing the second, concentrated solids-containing waste portion in the solids filter by passing therethrough a first portion of the substantially copper-free effluent from the ion exchanger, thereby further reducing the amount of dissolved copper contained therein; and discharging the washed concentrated solids-containing waste portion into a waste drain, thereby providing a sludge-free treatment of the CMP waste liquid slurry.

In embodiments according to the invention, a second portion of the substantially copper free effluent from the ion exchanger is discharged into a waste drain or recycled for use in the CMP processing, a liquid regenerating agent is passed through the ion exchanger for extracting the copper therefrom as a liquid solution, and the extracted copper-containing liquid solution is supplied to an electrochemical cell for performing an electrowinning process therein to obtain solid copper for re-use.

According to still another aspect of the present invention, a system for sludge-free treatment of a waste liquid slurry containing dissolved metal(s) comprises:

a solids filter for separating an input stream of waste liquid slurry into a first, solids-free filtrate portion containing the dissolved metal(s) and a second, concentrated solids-containing waste portion having a substantially reduced dissolved metal(s) concentration;

an ion exchanger for receiving the first, solids-free liquid filtrate portion containing the dissolved metal(s) and for supplying therefrom a substantially metal-free effluent;

a conduit for supplying a portion of the substantially metal(s)-free effluent from the ion exchanger back to the solids filter for washing the second, concentrated solids-containing portion to further reduce the amount of dissolved metal(s) contained therein; and an outlet from the solids filter for discharging the washed concentrated solids-containing portion to a waste drain.

According to embodiments of the invention, the system further comprises a source of regenerating agent for extracting the metal(s) from the ion exchanger in the form of a metal(s)-containing solution, and an electrolytic cell for receiving the metal(s) containing solution and performing an electrowinning process therein for obtaining solid metal(s) for re-use.

Additional advantages and aspects of the present invention will become readily apparent to those skilled in the art from the following detailed description, wherein only the preferred embodiment of the present invention is shown and described, simply by way of illustration of the best mode contemplated for carrying out the method of the present invention. As will be described, the present invention is capable of other and different embodiments, and its several details are capable and susceptible of modifications in various obvious respects, all without departing from the present invention. Accordingly, the drawing and description are to be regarded as illustrative in nature, and not as limitative.

DESCRIPTION OF THE INVENTION

Figure 1:
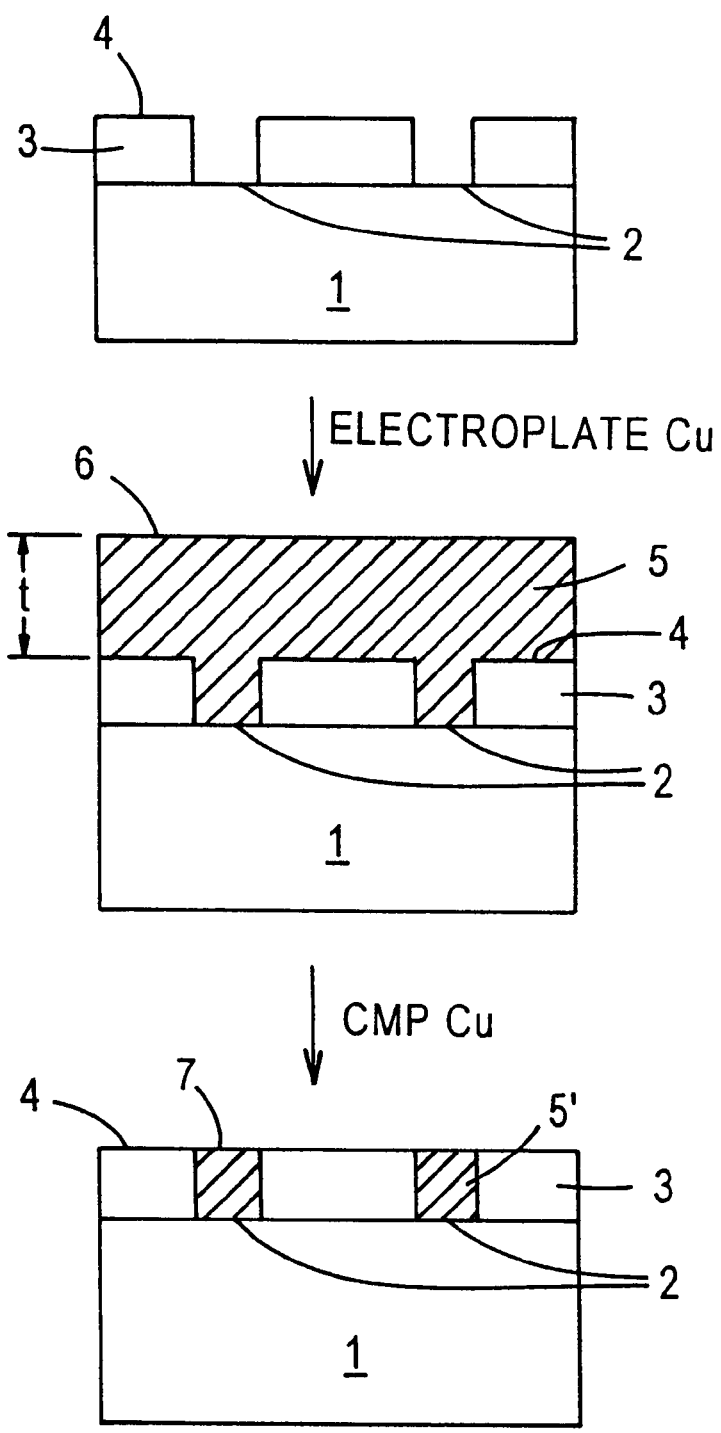
FIG. 1 illustrates, in simplified cross-sectional schematic form, conventional steps for performing a damascene type metallization process utilizing chemical-mechanical polishing (CMP)
Figure 2:
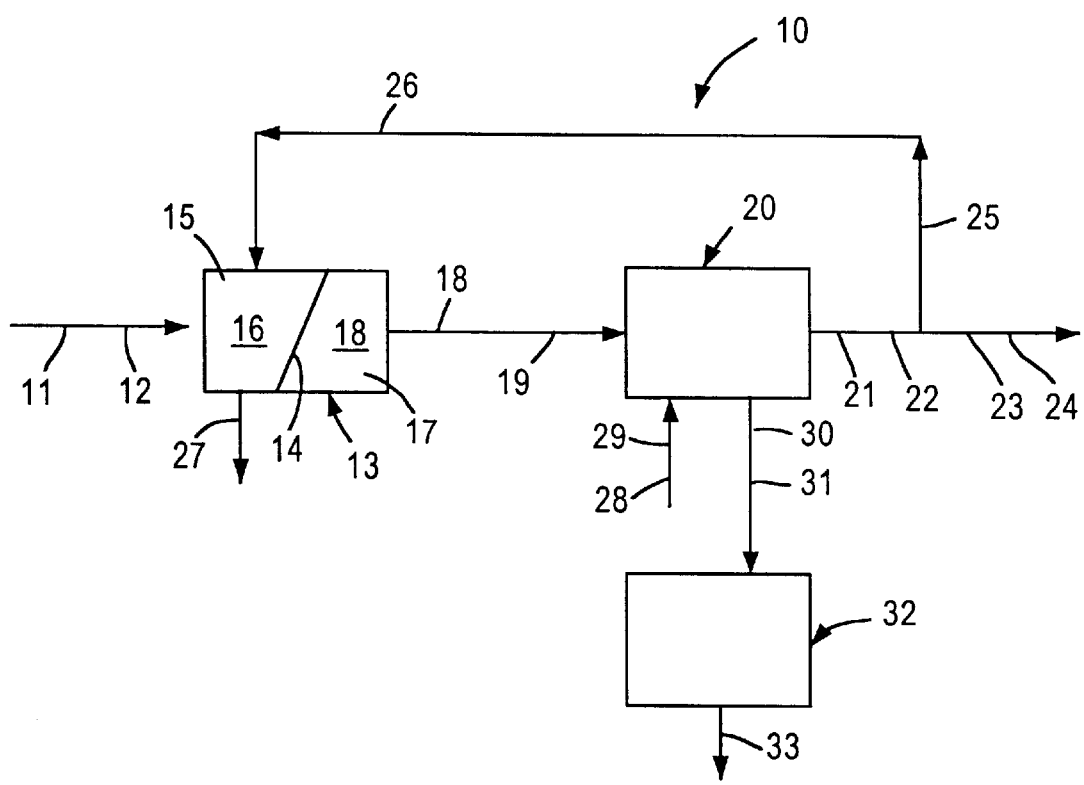
FIG. 2 illustrates, in simplified schematic form, a system for performing sludge-free treatment of a metal-containing waste liquid slurry according to an embodiment of the present invention.

Referring now to FIG. 2, shown therein is an exemplary embodiment of a system 10 for practicing the sludge-free treatment of waste liquid slurries containing dissolved metal (s) according to the present invention. As illustrated, a waste liquid slurry 11 is supplied via an inlet conduit 12 to a solids filter 13 for separating the slurry particles from the liquid vehicle. Filter 13 comprises a filter element or member 14 which cannot pass the slurry solids but which freely passes the metal(s)-containing liquid vehicle therethrough. Filter element or member 14 divides the interior volume of filter 13 into a first space or compartment 15 for containing therein a concentrated solids portion 16 of the waste liquid slurry 11 and a second space or compartment 17 for receiving a solids-free filtrate portion 18 of the waste liquid slurry 11 containing dissolved metal(s) therein. In a typical but non-limiting example, waste liquid slurry 11 supplied to the system by inlet conduit 12 has a solids content of about 0.1% by weight and the concentrated solids portion 16 in compartment 15 has a solids content of about 5% by weight.

In a following step according to an embodiment of the present invention, the solids-free, dissolved metal(s) containing filtrate portion 18 is supplied via conduit 19 to an ion exchanger 20, suitably of conventional type employing an ion exchange resin, where the metal(s) are removed from the solids-free filtrate. Substantially metal(s)-free liquid effluent 21 emerges from the ion exchanger 20 via outlet conduit 22, and is divided into two streams. A first stream 23 flows through conduit 24 for use as recycled rinse water (after pH adjustment, etc., as necessary) or is discharged from the system to a waste drain. A second stream 25 is supplied to the first compartment 15 of filter 13 via conduit 26 to back-wash the concentrated solids portion 16 contained therein. The metal(s) content of concentrated solids portion 16 is thereby reduced to a sufficiently low level as to permit environmentally acceptable, direct, sludge-free discharge thereof to a waste drain via outlet conduit 17. As with the waste liquid slurry 11 initially supplied via inlet conduit 12, back-wash liquid 25 containing any metal(s) extracted from the concentrated solids portion 16 freely passes through filter element 14 and is subjected to metal(s) removal therefrom by ion exchanger 20.

In a further aspect according to the present invention, a liquid regenerating agent 28, illustratively a mineral acid such as sulfuric acid, is supplied to ion exchanger 20 via inlet conduit 29 for extracting the metal(s) contained therein as a result of previous removal of same from the solids-free filtrate 18 supplied from the second compartment 17 of filter 13. In instances where the metal(s) contained in the regenerating agent 28 are susceptible of electrodeposition, liquid solution 30 of the extracted metal(s) contained in the regenerating agent is then supplied via inlet conduit 31 to electrolysis cell 32, where solid metal(s) is (are) recovered from solution by performing an electrowinning process. The recovered metal(s) may then be further processed for re-use in metallization processing or other type application. In the event the metal(s) extracted from the ion exchanger 20 are not readily susceptible of electrolytic recovery, other conventional chemical techniques readily determinable by one of ordinary skill in the art, such as precipitation, absorption, etc., may be employed for recovering the metal(s) or derivatives thereof in solid form. Electrolysis cell 32 is provided with an outlet conduit 33 for return of electrolyzed liquid to the ion exchanger 20 or mixed with the incoming waste CMP slurry entering the system via inlet conduit 12.

EXAMPLE

A spent CMP metals polishing slurry diluted with rinse liquid and containing water, dissolved copper at a concentration of about 2–15 ppm, 0.03–1% by wt. solid particles of polishing aggregate (alumina), solubilizers, and conditioners was discharged from the CMP station of a semiconductor processing line into an equalization tank After the pH and oxidation-reduction potential (ORP) of the slurry in the equalization tank was monitored and adjusted, in conventional fashion, the slurry was pumped through a solids filter having a polypropylene fabric-based filter element (EPOX, available from Kinetico, San Anselmo, Calif.) for forming therein a concentrated solids-containing slurry having about 5% by wt. solids content. The solids-free copper-bearing solution passing through the filter element was then passed through an activated carbon filter for removal of organics, etc., and then passed through an ion exchanger (e.g., available from U.S. Filter Co., Billerica, Mass.) to substantially remove the copper therefrom.

The substantially copper-free effluent from the ion exchanger was then divided into two streams. A first stream was fed to the filter compartment containing the concentrated solids portion of the waste slurry to back-wash the solid polishing aggregate so as to further extract soluble copper therefrom. After extracting the copper, the back-wash liquid passed through the carbon filter and the ion exchanger, as before. The volume of back-wash liquid required to reduce the copper level to an environmentally acceptable level (which varies depending upon the locality) for direct discharge into the waste main depended upon the initial copper concentration in the CMP waste slurry and the volume of the concentrated solids portion in the filter. In some instances, depending upon its pH, the washed concentrated solids slurry was supplied to an acid waste neutralization tank prior to discharge into the waste main.

In some instances, the second stream of substantially copper-free effluent from the ion exchanger was either directly discharged to the waste main or preliminarily supplied to an acid waste neutralization tank, depending upon its pH. In other instances, the copper-free effluent was recycled after acid waste neutralization rather than discharged to the waste drain.

Depending upon the initial concentration of dissolved copper in the CMP waste slurry, flow rates, and ion exchange capacity, the ion exchanger was periodically treated in conventional manner with a sulfuric acid containing solution for extracting the removed copper therefrom and regenerating the ion exchange resin. The copper, in the form of a solution of copper sulfate, was then supplied to an electrolytic cell where a conventional electrowinning process was performed to substantially remove the copper therefrom in solid form by cathodic electrodeposition. The copper may then be reprocessed, etc., for re-use in semiconductor metallization or other applications, as desired. The low-copper level solution remaining in the electrolytic cell after electrowinning may be returned to the ion exchanger for performing further regeneration/extraction or mixed with the incoming CMP waste slurry in the equalization tank.

A number of advantages are thus provided by the present invention, including but not limited to: sludge-free treatment and discharge of solids from spent CMP slurries in an environmentally acceptable manner; optional recycling and re-use of CMP and rinse water; removal of dissolved metal (s) to levels permitting environmentally acceptable discharge of CMP and rinse water; and recovery of dissolved metal(s) in re-usable solid form. In addition, the present invention is advantageously fully compatible with all aspects of conventional CMP process technology.

In the previous descriptions, numerous specific details are set forth, such as particular materials, structures, reactants, processes, etc., in order to provide a thorough understanding of the present invention. However, it should be recognized that the present invention can be practiced without resorting to the details specifically set forth. For example, the present invention is also applicable to processing metal containing slurries obtained in various metals-finishing and metallurgical sample preparation processes. In other instances, well-known processing structures, apparatuses, and techniques have not been described in detail in order not to unnecessarily obscure the present invention.

Only the preferred embodiments of the present invention are shown and described herein. It is to be understood that the present invention is capable of changes and/or modifications within the scope of the inventive concept as expressed herein.

What is claimed is:

1. A sludge-free method of treating a waste liquid slurry containing dissolved metal(s), the method comprising the steps of:

providing a waste treatment system including a solids filter and an ion exchanger;

supplying the waste liquid slurry containing dissolved metal(s) to the solids filter to separate the slurry into a first, solids-free liquid filtrate portion containing the dissolved metal(s) and a second, concentrated solids-containing waste portion having a substantially reduced dissolved metal(s) concentration;

passing the first, solid-free liquid filtrate portion through the ion exchanger to substantially remove the dissolved metal(s) and provide a substantially metal(s)-free liquid effluent therefrom;

washing the second, concentrated solids-containing waste portion in said solids filter by passing therethrough a first portion of the substantially metal(s)-free liquid effluent from the ion exchanger, thereby further reducing the amount of dissolved metal(s) contained therein; and discharging the washed, concentrated solids-containing waste portion into a waste drain, thereby providing a sludge-free treatment of the waste liquid slurry.

2. The method according to claim 1, further comprising discharging from the ion exchanger a second portion of the substantially metal(s)-free effluent.

3. The method as in claim 1, further comprising extracting the metal(s) removed from the filtrate portion by the ion exchanger.

4. The method as in claim 3, comprising extacting the metal(s) as a liquid solution of the metal(s).

5. The method as in claim 4, comprising treating the liquid solution to obtain solid metal(s) or metal(s)-containing material therefrom.

6. The method as in claim 5, comprising passing through the solids filter a waste liquid slurry from a chemical-mechanical polishing apparatus, wherein the solids comprise polishing particles.

7. The method as in claim 6, comprising treating the liquid solution by electrowinning to obtain solid metal(s) therefrom.

8. The method as in claim 7, wherein the metal(s) is (are) at least one of cobalt, nickel, copper, gold, silver, and alloys thereof.

9. The method as in claim 8, wherein the at least one metal is copper or a copper alloy.

10. The method as in claim 6, wherein the waste liquid slurry supplied to the solids filter has a solids content of about 0.03–1% by weight and the concentrated solids-containing waste portion discharged from the solids filter to the waste drain has a solids concentration of about 5% by weight.

11. A sludge-free method of treating a dissolved copper-containing waste liquid slurry from a chemical-mechanical polishing (CMP) process, said slurry comprising polishing particles, the method comprising the steps of:

providing a waste treatment system including a solids filter and an ion exchanger;

supplying the copper-containing waste liquid slurry to the solids filter to separate the slurry into a first, solids-free liquid filtrate portion containing dissolved copper and a second, concentrated solids-containing waste portion having a substantially reduced dissolved copper concentration;

passing the first, solids-free liquid filtrate portion through the ion exchanger to substantially remove the dissolved copper and provide a substantially copper-free effluent therefrom;

washing the second, concentrated solids-containing waste portion in the solids filter by passing therethrough a first portion of the substantially copper-free effluent from the ion exchanger, thereby further reducing the amount of dissolved copper contained therein; and discharging the washed concentrated solids-containing waste portion into a waste drain, thereby providing a sludge-free treatment of the CMP waste liquid slurry.

12. The method as in claim 11, further comprising discharging from the ion exchanger a second portion of the substantially dissolved copper-free effluent.

13. The method as in claim 11, further comprising passing a liquid regenerating agent through the ion exchanger to extract therefrom a copper-containing liquid solution.

14. The method as in claim 13, wherein the liquid regenerating agent comprises sulfuric acid.

15. The method as in claim 14, further comprising passing the copper-containing liquid solution to an electrochemical cell and performing an electrowinning process therein to obtain solid copper.

16. A system for sludge-free treatment of a waste liquid slurry containing dissolved metal(s), comprising:

a solids filter for separating an input stream of said waste liquid slurry into a first, solids-free filtrate portion containing said dissolved metal(s) and a second, concentrated solids-containing waste portion having a substantially reduced dissolved metal(s) concentration;

an ion exchanger for receiving said first, solids-free liquid filtrate portion containing said dissolved metal(s) and for supplying therefrom substantially metal(s)-free effluent;

a conduit for supplying a portion of said substantially metal(s)-free effluent from said ion exchanger back to said solids filter for washing the second, concentrated solids-containing portion to further reduce the amount of dissolved metal(s) contained therein; and an outlet from said solids filter for discharging the washed, concentrated solids-containing portion to a waste drain.

17. A system as in claim 16, further comprising a source of regenerating agent for extracting the metal(s) from said ion exchanger in the form of a metal(s)-containing liquid solution.

18. A system as in claim 17, further comprising an electrolytic cell for receiving said metal(s)-containing liquid solution.

19. A system as in claim 18, wherein said electrolytic cell comprises an electrowinning cell for obtaining solid metal(s) by electrolysis of said metal-containing liquid solution.

20. A system as in claim 19, further comprising a conduit for supplying electrolyzed liquid from said electrowinning cell to said ion exchanger for extracting said metal(s) therefrom.

* * * * *